(12) United States Patent
Ganzel

(10) Patent No.: US 12,311,902 B2
(45) Date of Patent: May 27, 2025

(54) APPARATUS AND METHOD FOR CONTROL OF A HYDRAULIC BRAKE SYSTEM

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 595 days.

(21) Appl. No.: 17/400,386

(22) Filed: Aug. 12, 2021

(65) Prior Publication Data
US 2023/0048177 A1 Feb. 16, 2023

(51) Int. Cl.
| | |
|---|---|
| *B60T 7/04* | (2006.01) |
| *B60T 8/40* | (2006.01) |
| *B60T 13/16* | (2006.01) |
| *B60T 13/68* | (2006.01) |
| *B60T 13/74* | (2006.01) |

(52) U.S. Cl.
CPC ............ *B60T 7/042* (2013.01); *B60T 8/4081* (2013.01); *B60T 13/168* (2013.01); *B60T 13/686* (2013.01); *B60T 13/745* (2013.01); *B60T 2270/402* (2013.01)

(58) Field of Classification Search
CPC ........ F16D 55/10; B60T 8/4081; B60T 7/042; B60T 13/146; B60T 13/686; B60T 13/168; B60T 13/745; B60T 2220/04; B60T 2270/82; B60T 2270/402; B60T 2270/404; B60T 11/165; B60T 13/62; B60T 13/662; B60T 17/06; B60T 8/17; B60T 2270/10; B60T 2270/20; B60T 2270/30

USPC ....................................................... 303/113.1
See application file for complete search history.

(56) References Cited

U.S. PATENT DOCUMENTS

| | | | | |
|---|---|---|---|---|
| 6,135,575 | A | * 10/2000 | Feigel | ................... B60T 8/4863 |
| | | | | 303/114.1 |
| 2019/0031165 | A1 | * 1/2019 | Besier | ..................... B60T 8/348 |
| 2019/0092304 | A1 | * 3/2019 | Ganzel | ................. B60T 13/686 |
| 2019/0248348 | A1 | * 8/2019 | Ganzel | ................. B60T 13/745 |
| 2020/0216052 | A1 | * 7/2020 | Campau | ................ B60T 13/745 |

(Continued)

FOREIGN PATENT DOCUMENTS

| | | | | |
|---|---|---|---|---|
| GB | 2587377 | A * | 3/2021 | ............ B60T 13/662 |
| WO | WO-2019108761 | A1 * | 6/2019 | ............ B60T 13/168 |

*Primary Examiner* — Robert A. Siconolfi
*Assistant Examiner* — San M Aung
(74) *Attorney, Agent, or Firm* — Tarolli, Sundheim, Covell & Tummino LLP

(57) ABSTRACT

A brake system for hydraulically actuating a pair of front wheel brakes and a pair of rear wheel brakes includes a master cylinder fluidly connected to a reservoir and operable to provide a brake signal responsive to actuation of a brake pedal connected thereto. The master cylinder is selectively operable during a manual push-through mode by actuation of the brake pedal to generate brake actuating pressure at an output for hydraulically actuating a selected one of the pair of front and rear wheel brakes. A first power transmission unit is configured for actuating the selected one of the pair of front and rear wheel brakes. A second power transmission unit is configured for actuating the other one of the pair of front and rear wheel brakes. A first electronic control unit is provided for controlling at least one of the first and second power transmission units.

12 Claims, 2 Drawing Sheets

(56) References Cited

U.S. PATENT DOCUMENTS

2020/0307538 A1   10/2020  Ganzel
2020/0406878 A1*  12/2020  Friedrich .............. B60T 13/662
2021/0031741 A1*   2/2021  Alford ................... B60T 13/58
2021/0053540 A1*   2/2021  Besier ................... B60T 13/58
2021/0094523 A1*   4/2021  Dinkel ................. B60T 13/745
2021/0221345 A1*   7/2021  Maruo ................... B60T 7/042

* cited by examiner

APPARATUS AND METHOD FOR CONTROL OF A HYDRAULIC BRAKE SYSTEM

TECHNICAL FIELD

This disclosure relates to an apparatus and method for control of a hydraulic brake system and, more particularly, to a method and apparatus for hydraulically actuating a pair of front wheel brakes and a pair of rear wheel brakes, the system having normal non-failure and backup braking modes.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

Very large vehicles with a hydraulic brake often have no choice other than to use an engine-driven pump-powered hydro-mechanical booster along with a separate slip control unit, because of the large brake fluid volumes needed by such vehicles. Existing secondary brake modules are not suited to support very large vehicles in a durable and cost-effective manner.

SUMMARY

In an aspect, a brake system for hydraulically actuating a pair of front wheel brakes and a pair of rear wheel brakes is disclosed. The system has normal non-failure and backup braking modes. The system includes a reservoir and a master cylinder fluidly connected to the reservoir and operable to provide a brake signal responsive to actuation of a brake pedal connected thereto. The master cylinder is selectively operable during a manual push-through mode by actuation of the brake pedal to generate brake actuating pressure at an output for hydraulically actuating a selected one of the pair of front wheel brakes and the pair of rear wheel brakes. A brake simulator is in selective fluid communication with the master cylinder for providing predetermined brake pedal response. A first power transmission unit is in fluid communication with the master cylinder and the reservoir. The first power transmission unit is configured for selectively providing pressurized hydraulic fluid for actuating the selected one of the pair of front wheel brakes and the pair of rear wheel brakes in a non-failure normal braking mode. A second power transmission unit is in fluid communication with the reservoir. The second power transmission unit is configured for selectively providing pressurized hydraulic fluid for actuating the other one of the pair of front wheel brakes and the pair of rear wheel brakes in a non-failure normal braking mode. A first electronic control unit is provided for controlling at least one of the first and second power transmission units.

In an aspect, a brake system for actuating a pair of front wheel brakes and a pair of rear wheel brakes is provided. The system includes a reservoir and a deceleration signal transmitter operable by actuation of a brake pedal connected to the deceleration signal transmitter to generate a brake actuating signal. First and second power transmission units are configured for selectively providing pressurized hydraulic fluid for actuating a corresponding one of the pair of front wheel brakes and the pair of rear wheel brakes during a braking event. First and second electronic control units are provided for controlling the first and second power transmission units, respectively. A multiplex control valve arrangement is hydraulically interposed between a respecting power transmission unit and each wheel brake of the corresponding one of the pair of front wheel brakes and the pair of rear wheel brakes. The multiplex control valve arrangement for a selected one of the pair of front wheel brakes and the pair of rear wheel brakes is controlled by the first or second electronic control unit that controls the first or second power transmission unit corresponding to the selected one of the pair of front wheel brakes and the pair of rear wheel brakes.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
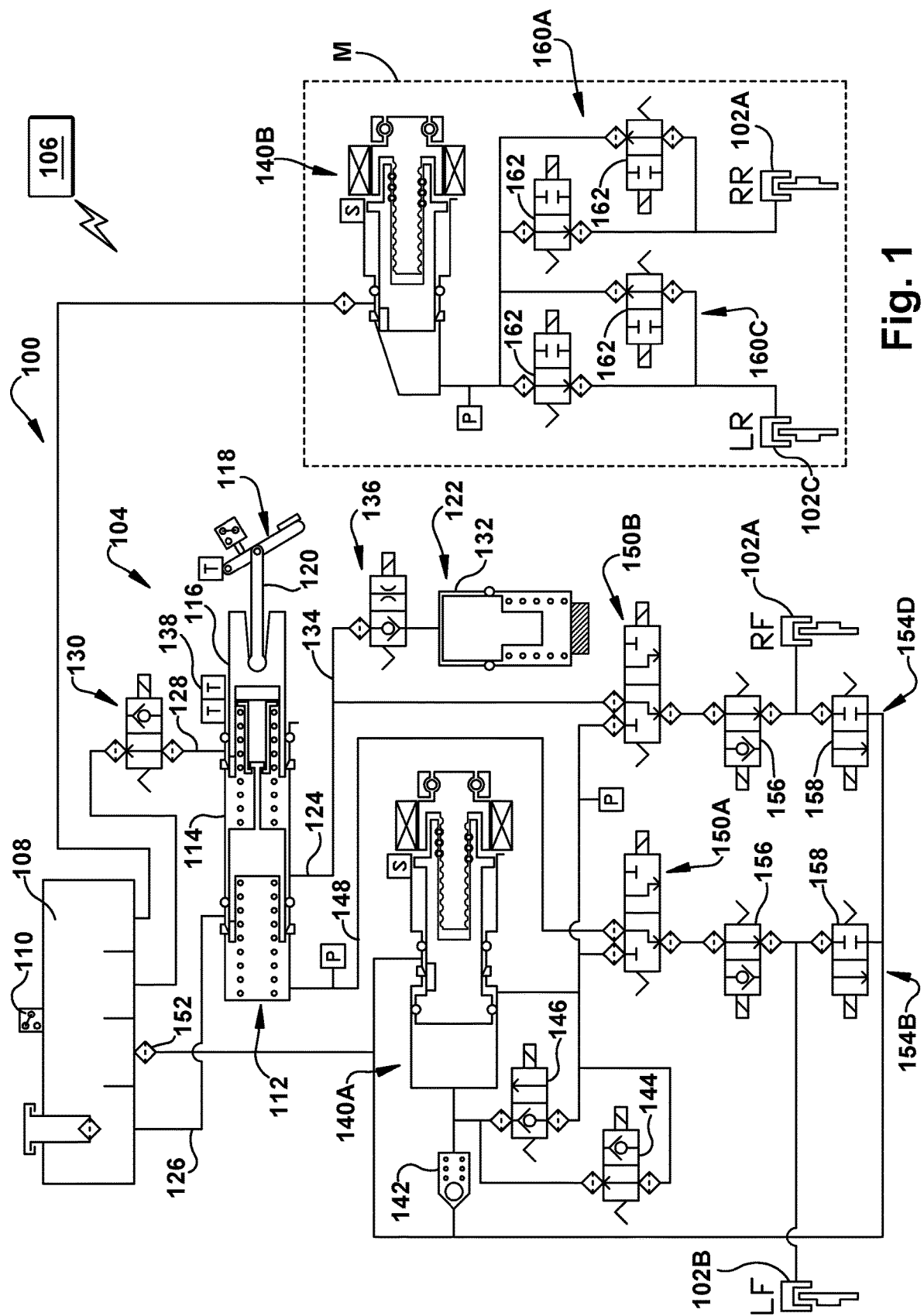
FIG. 1 is a schematic hydraulic diagram of a brake system according to an aspect of the present invention, in a first configuration.
Figure 2:
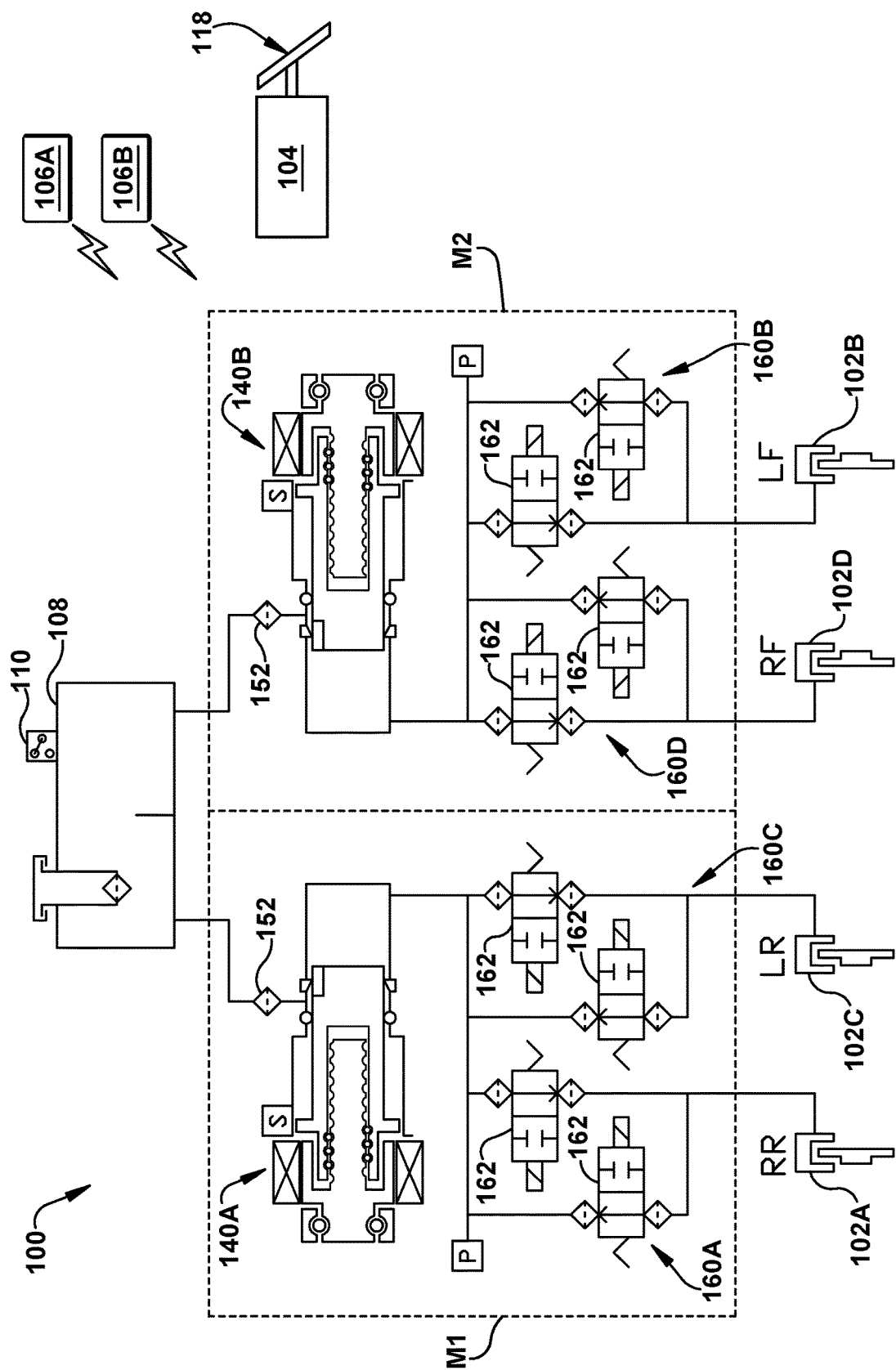
FIG. 2 is a schematic hydraulic diagram of the brake system of FIG. 1, in a second configuration.

FIGS. 1-2 depict a brake system 100, in first and second embodiments, respectively, for selectively actuating at least one of a pair of front wheel brakes and a pair of rear wheel brakes of a vehicle. The brake systems 100 may suitably be used on a ground vehicle, such as an automotive vehicle having four wheels with a wheel brake associated with each wheel. Furthermore, the brake systems 100 can be provided with other braking functions such as anti-lock braking (ABS) and other slip control features to effectively brake the vehicle. Components of the brake systems 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake systems 100, there are four wheel brakes 102A, 102B, 102C, and 102D. The wheel brakes 102A, 102B, 102C, and 102D can have any suitable wheel brake structure operated electrically and/or by the application of pressurized brake fluid, though will be presumed to be hydraulically operated in the below description. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the selected brake system 100 is installed. The brake system 100 has normal non-failure and backup braking modes.

While not shown herein, it is contemplated that the wheel brakes 102A, 102B, 102C, and 102D could each be powered electrically and/or hydraulically—for example, the front wheel brakes 102B and 102D could be electrically powered and the rear wheel brakes 102A and 102C could be hydraulically powered, and/or at least one of the wheel brakes 102A, 102B, 102C, and 102D could be powered electrically during certain phases of operation (e.g., service/parking) and hydraulically during other phases of operation (e.g., parking/service), of the same brake system 100, in addition to the potential provision of electrically or hydraulically operated parking brakes to any of the front and/or rear wheels, as desired.

In the example shown in the Figures, the hydraulically operated wheel brake 102A may be associated with a right rear wheel of the vehicle in which the brake system 100 is installed, and the hydraulically operated wheel brake 102B may be associated with the left front wheel. The hydraulically operated wheel brake 102C may be associated with the left rear wheel, and the hydraulically operated wheel brake 102D may be associated with the right front wheel.

The brake systems 100 may include a brake pedal unit, indicated generally at 104, an electronic control unit 106, and a fluid reservoir 108. The reservoir 108 stores and holds hydraulic fluid for the brake system 100. The fluid within the reservoir 108 is preferably held at or about atmospheric pressure, but the fluid may be stored at other pressures if desired. The reservoir 108 is shown schematically as having four tanks or sections in FIG. 1, and two tanks or sections in FIG. 2, with fluid conduit lines connected to the tanks or sections. The sections can be separated by several interior walls within the reservoir 108 and are provided to prevent complete drainage of the reservoir 108 in case one of the sections is depleted due to a leakage via one of the two lines connected to the reservoir 108. Alternatively, the reservoir 108 may include multiple separate housings. The reservoir 108 may include at least one fluid level sensor 110 for detecting the fluid level of one or more of the sections of the reservoir 108.

One or more electronic control units ("ECU") 106 are provided to the brake system 100 and may include microprocessors and other electrical circuitry. The ECU 106 receives various signals, process signals, and control the operation of various electrical components of the brake system 100 in response to the received signals, in a wired and/or wireless manner. The ECU 106 can be connected to various sensors such as the reservoir fluid level sensor 110, pressure sensors, travel sensors, switches, wheel speed sensors, and steering angle sensors. The ECU 106 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 106 may be connected to the instrument cluster for collecting and supplying information related to warning indicators such as an ABS warning light, a brake fluid level warning light, and a traction control/vehicle stability control indicator light.

A second ECU 106 may be provided in situations such as, for example, an at least partially autonomous vehicle. One of ordinary skill in the art will be able to readily provide any desired number of ECUs 106, having any suitable characteristics, for a particular use environment of the present invention.

As shown schematically in FIG. 1, the brake pedal unit 104 may include a master cylinder 112 with an MC housing 114 defining a longitudinally extending bore for slidably receiving various cylindrical pistons and other components therein. Examples of such components are the first and second springs longitudinally extending in series within the bore, as shown in the Figures. Note that the MC housing 114 is not specifically schematically shown in the Figures, but instead the walls of the longitudinally extending bore are schematically illustrated. The MC housing 114 may be formed as a single unit or include two or more separately formed portions coupled together. For some use environments, the master cylinder 112 may be of a tandem or sequential cutoff type.

An MC primary piston 116 is connected with a brake pedal 118 via a linkage arm 120. Leftward movement of the MC primary piston 116 may cause, under certain conditions, a pressure increase within the master cylinder 112.

A brake simulator 122 is in selective fluid communication with the master cylinder 112 for providing predetermined brake pedal response. As shown, the brake simulator 122 is connected to the master cylinder 112 via one or more hydraulic passages, but it is contemplated that the "selective fluid communication" could be provided via integration of the brake simulator 122 into the master cylinder 112.

More specifically, the master cylinder 112 is in fluid communication with the brake simulator 122 via a master cylinder passage 124. The MC primary piston 116 is slidably disposed in the bore of the MC housing 114. When the brake pedal unit 104 is in its rest position (the driver is not depressing the brake pedal 118), the structures of the master cylinder 112 permit fluid communication between the bore of the MC housing 114 and the reservoir 108 via a reservoir conduit 126 and a test valve conduit 128. The brake simulator 122 is therefore in selective fluid communication with the master cylinder 112 for providing predetermined brake pedal 118 response to the driver (e.g., brake pedal "feel").

The brake system 100 may further include an optional solenoid actuated simulator test valve 130 which may be electronically controlled between an open position and a powered closed position; the simulator test valve 130 may include a test valve spring biasing the simulator test valve 130 toward an open condition. The simulator test valve 130 is located fluidly between the reservoir 108 and the master cylinder 112. The simulator test valve 130 may not be needed during a normal brake apply or for a manual push-through mode. The simulator test valve 130 can be actuated to resist opening under predetermined pressure(s) during various testing modes to determine the correct operation of other components of the brake system 100. For example, the simulator test valve 130 may be actuated to a closed position to prevent venting to the reservoir 108 via the reservoir conduit 126 to monitor fluid flow to determine whether leaks may be occurring through seals of various components of the brake system 100.

A simulation pressure chamber 132 of the brake simulator 122 is in fluid communication with the brake simulator passage 134, which is in fluid communication with the master cylinder 112 of the brake pedal unit 104 via simulator valve 136. One example of desired operation of the simulator valve 136 is during a failed and/or initial/startup condition, in which the brake pedal unit 104 is utilized to provide a source of pressurized fluid to the hydraulically operated ones of the wheel brakes 102A, 102B, 102C, and 102D in a push-through manner, as described herein.

The brake pedal unit 104 is connected to the brake pedal 118 and is actuated by the driver of the vehicle as the driver presses on the brake pedal 118. A brake sensor or switch 138 (two shown, for redundancy) may be electrically connected to the ECU 106 to provide a brake signal indicating a depression of the brake pedal 118. That is, the master cylinder 112 is operable to provide a brake signal responsive to actuation of the brake pedal 118 connected thereto. The brake signal may be transmitted from at least one of the brake sensors 138 to the ECU 106 in any desired wired and/or wireless manner.

A first power transmission unit 140A is in fluid communication with the master cylinder 112 and the reservoir 108. The first power transmission unit 140A is configured for selectively providing pressurized hydraulic fluid for actuating a selected one of the pair of front wheel brakes 102B, 102D and the pair of rear wheel brakes 102A, 102C in a non-failure normal braking mode. As shown in FIG. 1, the first power transmission unit 140A actuates the front wheel brakes 102B, 102D A second power transmission unit 140B is in fluid communication with the reservoir 108. The second power transmission unit 140B is configured for selectively providing pressurized hydraulic fluid for actuating the other one of the pair of front wheel brakes 102B, 102D and the pair of rear wheel brakes 102A, 102C in a non-failure normal braking mode. As shown in FIG. 1, the second power transmission unit 140B actuates the rear wheel brakes 102A, 102C.

Because the master cylinder 112 is not integrated into the same portion of the brake system 100 circuit as the second power transmission unit 140B, manual push-through is not available for the wheel brakes 102 connected to the second power transmission unit 140B. The wheel brakes 102 connected to the first power transmission unit 140A, however, as shown in FIG. 1, will have available manual push-through due to the presence of the master cylinder 112 in that portion of the brake system 100 circuit. The electronic control unit 106 controls at least one of the first and second power transmission units 140A, 140B. It is contemplated that, for particular use environments of the brake system 100 of either configuration shown in the Figures, the electronic control unit 106 may be a first electronic control unit 106A which controls the first power transmission unit 140A, and the brake system 100 may further include a second electronic control unit 106B for controlling the second power transmission unit 140B.

After a brake apply, fluid from the hydraulically operated wheel brakes 102A, 102B, 102C, and 102D may be returned to the respective power transmission unit 140A, 140B and/or diverted to the reservoir 108. As shown in FIGS. 1-2, at least one power transmission unit of each depicted brake system 100 may be of the single-acting plunger type. Other suitable types of power transmission units 140 for use in the brake systems 100 shown in the Figures include, but are not limited to, dual-acting plunger type, rack-and-pinion type, and/or the power transmission unit shown and described in copending U.S. patent application Ser. No. 17/400,326, filed concurrently herewith and titled "Power Transmission Unit and Brake Systems Using Same", hereafter referenced as "the application Ser. No. 17/400,326", which is incorporated herein by reference in its entirety.

In the brake system 100 shown in FIG. 1, the first power transmission unit 140A includes a dual acting plunger unit configured to selectively generate the pressurized hydraulic fluid for actuating a corresponding wheel brake 102. A replenishing check valve 142, a normally open DAP valve 144, and a normally closed DAP valve 146 may be located fluidically between the reservoir 108 and the dual acting plunger type first power transmission unit 140A for assisting with refilling of the first power transmission unit 140A under predetermined conditions. The dual-acting plunger type first power transmission unit 140A may be, for example, similar to those disclosed in U.S. patent application Ser. No. 17/188,363, filed 1 Mar. 2021 and titled "Apparatus and Method for Control of a Hydraulic Brake System" and U.S. patent application Ser. No. 17/366,623, filed 2 Jul. 2021 and titled "Apparatus and Method for Redundant Control of a Hydraulic Brake System", the entire contents of both of which are incorporated herein by reference.

At least one of the first and second power transmission units 140A, 140B may include a single-acting plunger unit configured to selectively generate the pressurized hydraulic fluid for actuating a corresponding wheel brake. In the brake system 100 of FIG. 1, just the second power transmission unit 140B is of the single-acting plunger type. In the brake system 100 of FIG. 2, both the first and second power transmission units 140A, 140B are of the single-acting plunger type.

It is also contemplated that configurations (not shown) of the brake systems 100 could include hydraulic control of just two wheel brakes 102 (corresponding to the rear wheels or the front wheels), and/or electric actuation/control of one or more wheel brakes 102, in a service and/or parking context and either coordinated with the hydraulic actuation of the same brake 102 or as an electric-only scheme. One of ordinary skill in the art would be readily able to provide such an arrangement for a desired use environment, following aspects of the present invention.

The brake pedal unit 104 may be used as a backup source of pressurized fluid to essentially replace the normally supplied source of pressurized fluid from the first power transmission unit 140A under certain failed conditions of the brake system 100, and/or upon initial startup of the brake system 100. This situation is referred to as a manual push-through event, or a "manual apply" and may be accomplished during the backup braking mode. That is, the master cylinder 112 is selectively operable during a manual push-through mode by actuation of the brake pedal 118 to generate brake actuating pressure at at least one output (here, schematically shown as master cylinder output 148 and master cylinder passage 126) for hydraulically actuating a selected one of the pair of front wheel brakes 102B, 102D and/or the pair of rear wheel brakes 102A, 102C.

In such a push-through mode, the brake pedal unit 104 can supply pressurized fluid to a master cylinder output 148 and/or the master cylinder passage 124, which is then routed to the hydraulically operated wheel brakes 102A, 102B, 102C, and 102D as desired. This flow is pushed through, largely under mechanical pressure upon the brake pedal 118 from the driver's foot, from the master cylinder 112.

First and second two-position three-way valves 150A and 150B, respectively, are provided to the brake system 100 as shown in the first configuration of FIG. 1. Each of the first and second three-way valves 150A and 150B is hydraulically connected with the master cylinder 112, the first power transmission unit 140A, and at least a selected wheel brake of each of the pairs of the front and rear wheel brakes 102. For example, and as shown in FIG. 1, the first three-way valve 150A is in fluid communication with the left front wheel brake 102B, and the second three-way valve 150B is in fluid communication with the right front wheel brake 102D. The first and second three-way valves 150A and 150B each are configured to selectively switch the respective hydraulically operated brake (102B and 102D, respectively, as shown in FIG. 1) to receive fluid from a selected one of the master cylinder 112, in the backup braking mode, and the first power transmission unit 140A, in the normal non-failure braking mode. Through use of the first and second three-way valves 150A and 150B, hydraulic fluid can be routed to the wheel brakes 102 in a desired manner (from either the master cylinder 112 or the first power transmission unit 140A) to assist with boosted braking control and provide desired response times and efficient pressure flow to the respective wheel brakes 102 associated with each three-way valve.

A single three-way valve 150A or 150B may be used here instead of one normally-closed valve and one normally-open valve for cost and packaging reasons, but also to reduce current draw. This is mainly due to the fact that the normally-open valve would need an undesirably high force spring to avoid it becoming hydraulically locked closed if power is lost during a boosted brake apply, which could trap brake pressure and/or cause unwanted braking when the pedal is released. However, it is contemplated that one normally-closed valve and one normally-open valve could be used instead of the first and/or second three-way valves 150A and 150B, in particular use environments of the brake system 100. It should be appreciated that, when power is lost to the first and/or second three-way valves 150A and 150B, they may be configured, in some situations, to "fail" in such a position to facilitate manual push-through from the master cylinder 112, under the presumption that power might also be lost to the first power transmission unit 140A.

The electronic control unit 106 (when a single one is present) is configured to control the first and second power transmission unit 140A, 140B, the first three-way valve 150A, and the second three-way valve 150B responsive to the brake signal. It is also contemplated that, when two electronic control units 106 are provided to the brake system 100, a first electronic control unit 106A may be provided for controlling at least one of the first and second power transmission units 140A, 140B, and at least one of the first and second three-way valves 150A, 150B (e.g., in a normal non-failure braking mode), and a second electronic control unit 106B may be provided for controlling at least one of the first and second power transmission units 140A, 140B, and at least one of the first and second three-way valves 150A, 150B (e.g., in a backup braking mode), though one of ordinary skill in the art can readily provide a suitable system using first and second electronic control units 106 to provide desired redundancy for a particular use environment of the brake systems 100 of FIGS. 1-2.

At least one filter 152 may be provided in any desired position(s) within the brake systems 100. For example, and as shown in the Figures, many of the components of the brake system 100 may include a filter 152 positioned upstream and/or downstream thereof, along a hydraulic line. While example filters 152 are labeled in the Figures, one of ordinary skill in the art will be able to recognize multiple other diamond-shaped filter symbols in the depicted brake systems 100, left unlabeled for clarity of depiction.

ABS modulator arrangements 154B, 154D are interposed hydraulically between the first power transmission unit 140A and the pair of hydraulically actuated brakes associated therewith (front brakes 102B, 102D as shown in FIG. 1). The ABS modulator arrangements 154B, 154D are each controlled by the electronic control unit 106. The ABS modulator arrangements 154B, 154D each include respective serially arranged iso and dump valves 156, 158. The iso valve 156 for each ABS modulator arrangement 1542 is located hydraulically between a respective wheel brake 102 and the first power transmission unit 140A, and the dump valve 158 for each ABS modulator arrangement 154 is located hydraulically between a respective wheel brake 102 and the reservoir 108, for the corresponding wheel brake 102.

As shown in FIG. 1, the ABS modulator arrangements 154B and 154D may be interposed hydraulically between respective first or second three-way valves 146A, 146B and corresponding ones of the pair of hydraulically actuated brakes (here, left front wheel brake 102B and right front wheel brake 102D, respectively).

Also with reference to FIG. 1, a multiplex control valve arrangement 160A, 160C may be hydraulically interposed between the second power transmission unit 140B and the corresponding brake of the other one of the pair of front wheel brakes and the pair of rear wheel brakes (here, left front wheel brake 102B and right front wheel brake 102D, respectively). The multiplex control valve arrangements 160A, 160C each include a pair of normally open iso-type valves 162, configured to provide multiplexed operation for brake control in a known manner. The iso-type valves 162 can each block fluid flow in both directions when energized, and are plumbed in parallel and reverse orientations, as shown in the Figures.

In the configuration depicted in FIG. 1, the multiplex control valve arrangements 160A, 160C and the second power transmission unit 140B could be co-located (as noted by the dashed line "M") in a modular or unitary component such as, but not limited to, that disclosed in the application Ser. No. 17/400,326. It is contemplated that the components located inside dashed line "M" in FIG. 1 may be spaced apart in the vehicle, hydraulically if not also mechanically, from components outside that line (i.e., by being located remote from one another within the brake system 100, and at least apart from a common housing or block).

With reference now to FIG. 2, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

FIG. 2 depicts a brake system 100 for actuating a pair of front wheel brakes and a pair of rear wheel brakes of a vehicle. The brake system 100 is shown here as a hydraulic brake by wire systems in which electronically controlled fluid pressure is utilized to apply braking forces for at least a portion of the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing. It is contemplated that the brake system 100 of FIG. 2 may be used with very large vehicles in which it may be difficult to provide electric brake service and/or parking functions, although electric service and/or parking brake functions could be accomplished at least partially electrically for one or more of the brakes 102, when sufficiently large and powerful electric brake components are provided.

In the illustrated embodiment of the brake system 100 in FIG. 2, the brake pedal unit 104 is of a deceleration signal transmitter type, operable by actuation of a brake pedal 118 connected to the deceleration signal transmitter 104 to generate a brake actuating signal. The brake pedal 118 and deceleration signal transmitter 104 are physically spaced apart from at least the reservoir 108 and first and second power transmission units 140A, 140B. The brake actuating signal is conveyed to at least one of the first and second electronic control units 106A, 106B solely as an electronic signal from the deceleration signal transmitter, in a wired and/or wireless manner. Alternatively, it is contemplated that a brake actuating signal could be conveyed in a wired or wireless manner to at least one of the first and second electronic control units 106A, 106B from a central controller (not shown) in a brake system 100 for a fully autonomous vehicle.

First and second power transmission units 140A, 140B are configured for selectively providing pressurized hydraulic fluid for actuating a corresponding one of the pair of front wheel brakes 102B, 102D and the pair of rear wheel brakes 102A, 102C during a braking event. The brake system 100 depicted in FIG. 2 is a front/rear ("vertical") split system, in which the front brakes 102B, 102D are actuated by the first power transmission unit 140A and the rear brakes 102A, 102C are actuated by the second power transmission unit 140B. While the brake system 100 could instead be of a diagonal split type, large scrub forces in very large vehicles may urge the use of a vertical split system.

First and second electronic control units 106A, 106B are provided for controlling the first and second power transmission units 140A, 140B, respectively A multiplex control valve arrangement 160 is hydraulically interposed between a respective first or second power transmission unit 140A, 140B and each wheel brake of the corresponding one of the pair of front wheel brakes 102A, 102C and the pair of rear wheel brakes 102B, 102D. The multiplex control valve arrangement 160 for a selected one of the pair of front wheel brakes 102A, 102C and the pair of rear wheel brakes 102B, 102D is controlled by the same first or second electronic control unit 106A, 106B that controls the first or second power transmission unit 140A, 140B corresponding to the selected one of the pair of front wheel brakes 102A, 102C and the pair of rear wheel brakes 102B, 102D. The multiplex control valve arrangements 160 each include two iso-type valves 162.

As shown in FIG. 2, and similarly to the description of like components of FIG. 1, the components enclosed by dashed lines "M1" and "M2" can each be modular or unitary components similar to those disclosed in the application Ser. No. 17/400,326, and can be spaced apart physically/mechanically and/or hydraulically in the vehicle from the remaining components of the brake system 100.

The first and second power transmission units 140A, 140B of FIGS. 1-2 may each be directly connected to the reservoir 108 with no valves hydraulically interposed therebetween.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a pair of front wheel brakes and a pair of rear wheel brakes, the system comprising:
    a reservoir;
    first and second power transmission units configured for selectively providing pressurized hydraulic fluid for actuating a corresponding one of the pair of front wheel brakes and the pair of rear wheel brakes during a braking event;
    first and second electronic control units for controlling the first and second power transmission units, respectively; and
    a multiplex control valve arrangement having a pair of normally open, iso-type valves arranged in parallel with one another and hydraulically interposed between a respecting power transmission unit and each wheel brake of the corresponding one of the pair of front wheel brakes and the pair of rear wheel brakes, the multiplex control valve arrangement for a selected one of the pair of front wheel brakes and the pair of rear wheel brakes being controlled by the first or second electronic control unit that controls the first or second power transmission unit corresponding to the selected one of the pair of front wheel brakes and the pair of rear wheel brakes.

2. The brake system of claim 1, further comprising:
    a master cylinder fluidly connected to the reservoir and operable to provide a brake signal responsive to actuation of a brake pedal connected thereto, the master cylinder being selectively operable during a manual push-through mode by actuation of the brake pedal to generate brake actuating pressure at an output for hydraulically actuating a selected one of the pair of front wheel brakes and the pair of rear wheel brakes; and
    a brake simulator in selective fluid communication with the master cylinder for providing predetermined brake pedal response;
    wherein the first power transmission unit is in fluid communication with the master cylinder and the reservoir and provided in a first brake circuit, the first power transmission unit being configured for selectively providing pressurized hydraulic fluid for actuating the selected one of the pair of front wheel brakes and the pair of rear wheel brakes in a non-failure normal braking mode,
    wherein the second power transmission unit is in fluid communication with the reservoir and provided in a second brake circuit fluidly disconnected from the first brake circuit.

3. The brake system of claim 1, the second power transmission unit includes a single acting plunger unit configured to selectively generate the pressurized hydraulic fluid for actuating a corresponding wheel brake.

4. The brake system of claim 2, wherein first and second two-position three-way valves are each hydraulically connected with the master cylinder, the first power transmission unit, and a corresponding brake of the selected one of the pair of front wheel brakes and the pair of rear wheel brakes, the first and second three-way valves selectively controlling hydraulic fluid flow from a chosen one of the master cylinder and the first power transmission unit to the corresponding brake of the selected one of the pair of front wheel brakes and the pair of rear wheel brakes; and
    an ABS modulator valve arrangement is hydraulically interposed between each of the first and second three-way valves and the corresponding brake of the selected one of the pair of front wheel brakes and the pair of rear wheel brakes.

5. The brake system of claim 4, wherein the ABS modulator valve arrangements each include iso and dump valves.

6. The brake system of claim 1, including a deceleration signal transmitter operable by actuation of a brake pedal connected to the deceleration signal transmitter to generate a brake actuating signal.

7. The brake system of claim 6, wherein the brake pedal and deceleration signal transmitter are physically spaced apart from at least the reservoir and first and second power transmission units, and the brake actuating signal is conveyed to at least one of the first and second electronic control units solely as an electronic signal from the deceleration signal transmitter.

8. The brake system of claim 7, wherein the brake actuating signal is conveyed wirelessly to at least one of the first and second electronic control units.

9. The brake system of claim 1, wherein the first and second power transmission units are directly connected to the reservoir with no valve hydraulically interposed therebetween.

10. The brake system of claim 2, wherein the first and second brake circuits are fluidly disconnected from each other downstream of the reservoir.

11. The brake system of claim 2, wherein in the manual push-through mode the master cylinder is incapable of hydraulically actuating the other one of the pair of front wheel brakes and the pair of rear wheel brakes.

12. The brake system of claim 1, wherein the first power transmission unit includes a dual acting plunger unit configured to selectively generate the pressurized hydraulic fluid in both forward and rearward stroke directions for actuating a corresponding wheel brake.

\* \* \* \* \*